(12) United States Patent
Sakata

(10) Patent No.: US 11,792,341 B2
(45) Date of Patent: Oct. 17, 2023

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Munetaka Sakata, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/665,807

(22) Filed: Feb. 7, 2022

(65) Prior Publication Data

US 2022/0166894 A1 May 26, 2022

Related U.S. Application Data

(63) Continuation of application No. 16/996,131, filed on Aug. 18, 2020, now Pat. No. 11,277,531, which is a
(Continued)

(30) Foreign Application Priority Data

Dec. 28, 2017 (JP) ................................ 2017-254396

(51) Int. Cl.
*H04N 1/00* (2006.01)
*H04L 51/08* (2022.01)
(Continued)

(52) U.S. Cl.
CPC ....... *H04N 1/00503* (2013.01); *G06F 3/1204* (2013.01); *G06F 3/1224* (2013.01);
(Continued)

(58) Field of Classification Search
CPC ........... H04N 1/00503; H04N 1/00225; H04N 1/00212; H04N 1/00411; G06F 3/1204;
(Continued)

(56) References Cited

U.S. PATENT DOCUMENTS 8,237,939 B2 8/2012 Kamiya et al.
8,334,991 B2 12/2012 Kamiya et al.
(Continued)

FOREIGN PATENT DOCUMENTS

JP 2004-146958 A 5/2004
JP 2004-364218 A 12/2004
(Continued)

OTHER PUBLICATIONS

Japanese Office Action dated Aug. 20, 2021 in counterpart Japanese Patent Appln. No. 2017-254396.
(Continued)

*Primary Examiner* — Neil R McLean
(74) *Attorney, Agent, or Firm* — Venable LLP

(57) ABSTRACT

The present invention provides an information processing apparatus and a method of controlling the same. The information processing apparatus has a console unit that accepts an instruction by a user via a button displayed on a screen. The information processing apparatus registers a setting for executing processing corresponding to the button, prompts a user to input identification information to be added to image data generated by a function corresponding to the button, and when the button is instructed via the console unit, the information processing apparatus outputs the image data to which the identification information has been added to a destination corresponding to the setting which is registered in association with the button.

9 Claims, 19 Drawing Sheets

Related U.S. Application Data continuation of application No. 16/229,581, filed on Dec. 21, 2018, now Pat. No. 10,791,232.

(51) Int. Cl.
*G06F 3/12* (2006.01)
*G06F 16/58* (2019.01)
*G06F 16/538* (2019.01)
G06F 3/0488 (2022.01)
G06F 3/0482 (2013.01)

(52) U.S. Cl.
CPC ........ *G06F 16/538* (2019.01); *G06F 16/5866* (2019.01); *H04L 51/08* (2013.01); *H04N 1/00212* (2013.01); *H04N 1/00225* (2013.01); *H04N 1/00411* (2013.01); *G06F 3/0482* (2013.01); *G06F 3/0488* (2013.01)

(58) Field of Classification Search
CPC ............... G06F 16/538; G06F 16/5866; G06F 3/1224; G06F 3/0482; G06F 3/0488; G06F 3/04886; G06F 3/04883; H04L 51/08
USPC ........................................................ 358/1.13
See application file for complete search history.

(56) References Cited

U.S. PATENT DOCUMENTS

| | | | |
|---|---|---|---|
| 8,572,213 | B2 | 10/2013 | Sakata |
| 2010/0149570 | A1 | 6/2010 | Kamiya et al. |
| 2012/0144478 | A1 | 6/2012 | Homma |
| 2012/0326962 | A1 | 12/2012 | Asai |
| 2016/0094754 | A1 | 3/2016 | Miyazawa |
| 2016/0301824 | A1* | 10/2016 | Shibao ............... H04N 1/00413 |
| 2016/0309052 | A1* | 10/2016 | Takahashi .......... H04N 1/00474 |

FOREIGN PATENT DOCUMENTS

| | | |
|---|---|---|
| JP | 2008-178067 A | 7/2008 |
| JP | 2010035149 A | 2/2010 |
| JP | 2012-044453 A | 3/2012 |
| JP | 2017-027548 A | 2/2017 |
| JP | 2019-121868 A | 7/2019 |

OTHER PUBLICATIONS

Japanese Office Action dated Jan. 5, 2023 in counterpart Japanese Patent Appln. No. 2022-030172.

* cited by examiner

FIG. 5

| DEVICE SERIAL No: abcd0101 | |
|---|---|
| APPLICATION MANAGEMENT | ONE-TOUCH SCAN AND SEND > DETAILED INFORMATION OF BUTTON > EDITING OF BUTTON |

EDITING OF BUTTON     [OK] ~512   [CANCEL] ~513

DETAILED INFORMATION OF BUTTON

BASIC SETTINGS
- BUTTON NAME: [REFERRAL FORM] ~501
- ☐ DISPLAY CONFIRMATION SCREEN BEFORE EXECUTION
- FILE NAME: [BUTTON NAME ▼] ~502 / [AUTOMATIC]
- KEYWORD: 503 ~ ☑ YES   [KEYWORD CHARACTER STRING SETTING] ~504
- ICON: ☑ 🗒 ☐ 📋 ☐ 📄 ☐ 📚 ☐ ⚠
- ALLOCATION: [NO ALLOCATION ▼] ~505 / [ALLOCATE (FILE)] / [ALLOCATE (FOLDER)] / [ALLOCATE (FILE AND FOLDER)]
- TRANSMISSION TYPE: [FILE ▼] 506 / [EMAIL] / [USB MEMORY]    [SWITCH] ~507

508 ~ SETTING MENU SWITCHES FOR EACH TRANSMISSION TYPE

TRANSMISSION SETTING (FILE)   509   510

- DESTINATION: [¥¥FILE SERVER¥ REFERRAL FORM]   [SELECT FROM ADDRESS BOOK ...]
- READING SIZE: [A4 ▼]    COLOR MODE: [COLOR ▼]
- FILE FORMAT: [PDF ▼] ~511
  - ENCRYPTED PDF: [Corresponds to Acrobat 10.0 / 256-bit AES ▼]
  - ☐ SET/CHANGE PASSWORD
  - PASSWORD: [ ]   CONFIRMATORY INPUT: [ ]
  - DIGITAL SIGNATURE: [NONE ▼]
  - ☐ DIVIDE EACH PAGE
- DENSITY: [0 ▼]
- ORIENTATION OF ORIGINAL: [PORTRAIT ORIGINAL ▼]
- ORIGINAL TYPE: [TEXT/PHOTOGRAPH ▼]
- DOUBLE-SIDED ORIGINAL: [BOOK TYPE ▼]
- SHARPNESS: [0 ▼]
- DATA SIZE: [LARGE: IMAGE QUALITY PRIORITY ▼]

FIG. 6

DEVICE SERIAL No: abcd0101

APPLICATION MANAGEMENT

ONE-TOUCH SCAN AND SEND > DETAILED INFORMATION OF BUTTON > EDITING OF BUTTON >
KEYWORD CHARACTER STRING SETTING

KEYWORD CHARACTER STRING SETTING

PLEASE SET KEYWORD CHARACTER STRING AND CLICK [OK].

| OK — 601 | CANCEL — 602 |

[KEYWORD CHARACTER STRING]

| CHARACTER TYPE | ONLY NUMBERS ▼ | — 603 |
| | ALPHANUMERIC | |

NUMBER OF CHARACTERS
(MAXIMUM 16 CHARACTERS)    | 7 | — 604

DISPLAY AT TIME OF INPUT
(MAXIMUM 64 CHARACTERS)    | PLEASE INPUT PATIENT NUMBER | — 605

FIG. 7

DEVICE SERIAL No: abcd0101

APPLICATION MANAGEMENT | ONE-TOUCH SCAN AND SEND > DETAILED INFORMATION > BUTTON EDITING > SELECT FROM ADDRESS BOOK

SELECT FROM ADDRESS BOOK

PLEASE SET DESTINATION FROM ADDRESS BOOK AND CLICK [OK].

[OK] 701  [CANCEL] 702

ADDRESS BOOK

TYPE: 705  BEST MEMBERS ▼ | DISPLAY SWITCHING 704

BEST MEMBERS 703

| SELECTION | NUMBER | TYPE | NAME | DESTINATION |
|---|---|---|---|---|
| ■ | 01 | ✉ | email_a | email_a@oanon.co.jp |
| ■ | 02 | ✉ | email_b | email_b@oanon.co.jp |
| ☑ | 03 | 📄 | REFERRAL FORM | \\FILE SERVER\REFERRAL FORM |
| ☐ | 04 | 📄 | INQUIRY FORM | \\FILE SERVER\INQUIRY FORM |

706

FIG. 13A
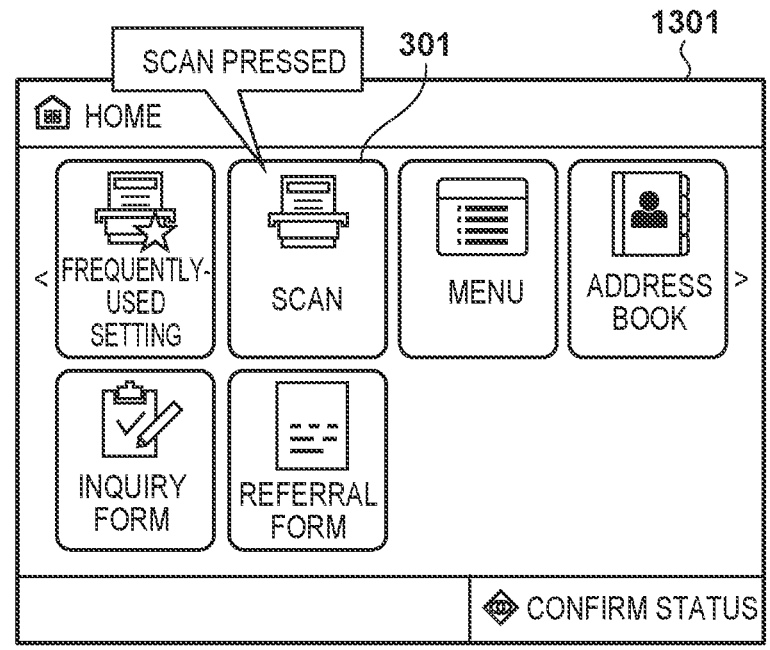
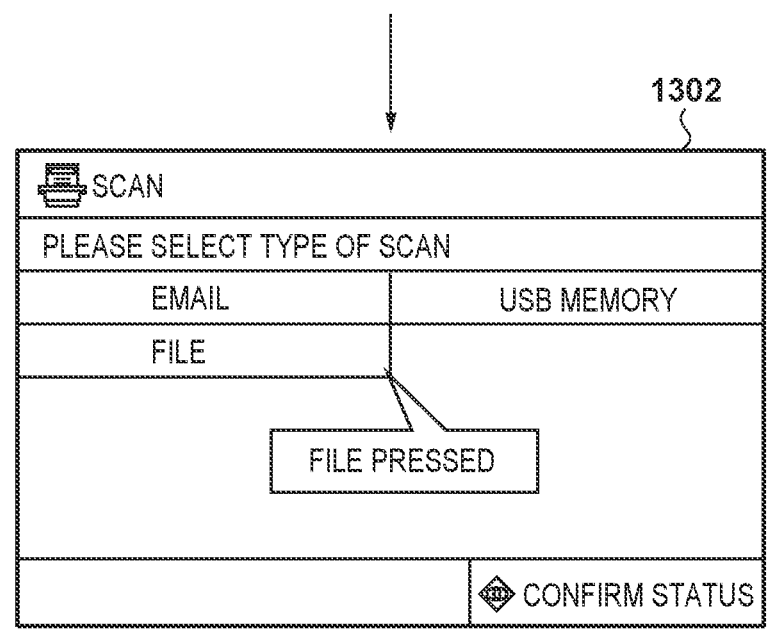

FIG. 13C

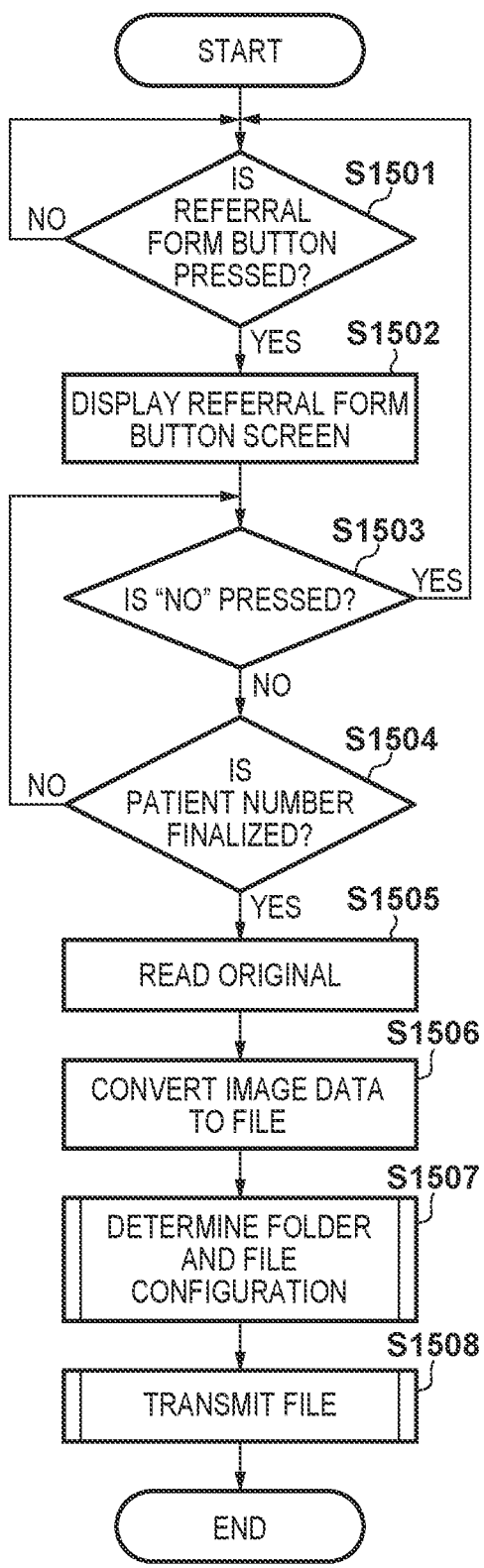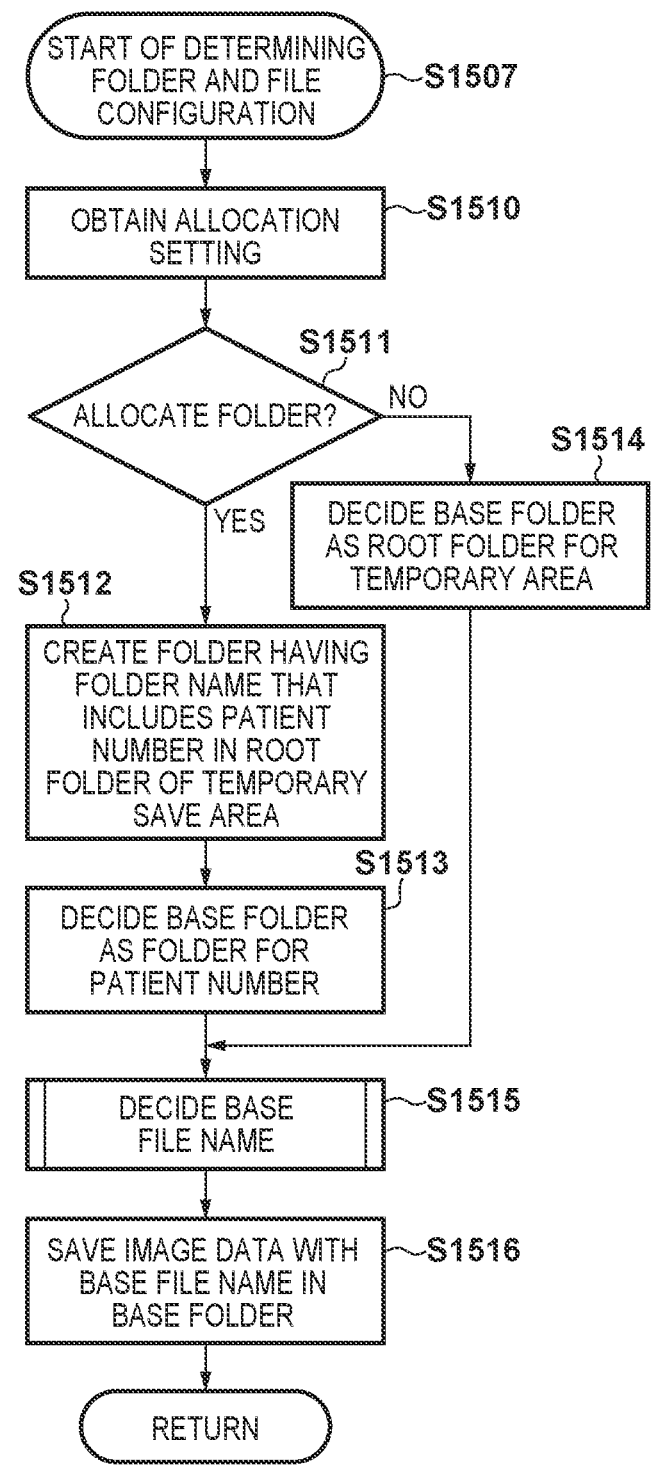

FIG. 18A

| FOLDER ALLOCATION | BASE FOLDER (FOLDER WHERE DIGITAL DATA IS SAVED) |
|---|---|
| NO | ROOT FOLDER OF TEMPORARY SAVE AREA (¥tmp OF FILE SYSTEM) |
| YES | PATIENT NUMBER FOLDER UNDER ROOT FOLDER OF TEMPORARY SAVE AREA (¥tmp¥0123456 OF FILE SYSTEM) |

FIG. 18B

| | INCLUDE PATIENT NUMBER | INCLUDE BUTTON NAME | BASE FOLDER NAME (EXAMPLE WHERE FILE EXTENSION IS pdf) |
|---|---|---|---|
| 1801 | NO | NO | 20170601120000.pdf |
| 1803 | NO | YES | REFERRAL FORM_20170601120000.pdf |
| 1802 | YES | NO | 0123456_20170601120000.pdf |
| 1804 | YES | YES | 0123456_REFERRAL FORM_20170601120000.pdf |

INFORMATION PROCESSING APPARATUS, METHOD OF CONTROLLING THE SAME, AND STORAGE MEDIUM

CROSS-REFERENCE TO RELATED APPLICATIONS

This application is a Continuation of U.S. patent application Ser. No. 16/996,131, filed Aug. 18, 2020, which is a Continuation of U.S. patent application Ser. No. 16/229,581, filed Dec. 21, 2018, and issued as U.S. Pat. No. 10,791,232 on Sep. 29, 2020, which claims the benefit of Japanese Patent Application No. 2017-254396, filed Dec. 28, 2017. The contents of these applications are hereby incorporated by reference herein in their entirety.

BACKGROUND OF THE INVENTION

Field of the Invention

The present invention relates to an information processing apparatus, a method of controlling the same, and a storage medium.

Description of the Related Art

A scanner or an image forming apparatus that reads an original by a reading device to convert it into digital image data is known. The user can use such an apparatus to convert an original into image data and transmit the image data to a destination such as a shared folder on a network.

In recent years, the importance of converting originals to image data has been increasing. This is because, when an image of an original is converted into image data, a storage place is unnecessary and management is easier in comparison to a case of storing and managing an original as paper. Furthermore, it becomes possible to search for necessary data in a short time. Accordingly, methods of constructing a workflow that optimally customizes reading of originals, data transmission, or the like for a user's work have been receiving attention.

Japanese Patent Laid-Open No. 2010-35149 discloses a technique for, in a workflow that includes processing for scanning an original and processing for transmitting image data, causing a workflow process instance to store destination information to thereby prevent transmission to an incorrect destination.

To optimize a user's work, it is necessary to convert an original to image data and transmit the image data with minimal operations. For example, giving an example of work in a hospital, in a large hospital it is necessary to manage referral forms or inquiry forms of patients introduced from other hospitals on a patient-by-patient basis. Normally the document format of a referral form or an inquiry form differs for each hospital. Accordingly, to make it easy to manage or search image data, approaches such as making patient identification information (an ID or the like) to be the file name of image data or transmitting image data to a folder to which such identification information has been added are necessary. In other words, to achieve work optimization, it is desirable that, for example, a user merely makes two instructions "patient identification information input" and "start original reading" to thereby enable a referral form, an inquiry form, or the like for the patient to be stored and managed in a predetermined folder, for example.

By using the invention disclosed in the foregoing Japanese Patent Laid-Open No. 2010-35149, a user can reliably transmit image data to a unique destination that is defined in advance. However, a special operation is necessary to add identification information to the file name of image data, or transmit image data to a folder whose name has identification information added thereto, and such an operation has not been easy for users.

SUMMARY OF THE INVENTION

An aspect of the present invention is to eliminate the above-mentioned problem with conventional technology.

The feature of the present invention is to provide a technique for enabling efficient management of generated image data by reducing effort by a user.

According to a first aspect of the present invention, there is provided an information processing apparatus, comprising: a console unit configured to accept an instruction by a user via a button displayed on a screen; a memory device that stores a set of instructions; and at least one processor that executes the instructions stored in the memory to: register a setting for executing processing corresponding to the button; prompt a user to input identification information to be added to image data generated by a function corresponding to the button; and when the button is instructed via the console unit, output the image data to which the identification information has been added to a destination corresponding to the setting which is registered in association with the button.

According to a second aspect of the present invention, there is provided a method of controlling an information processing apparatus, the method comprising: accepting an instruction by a user via a button displayed on a screen; registering a setting for executing processing corresponding to the button; prompting a user to input identification information to be added to image data generated by a function corresponding to the button; and outputting the image data to which the inputted identification information has been added to a destination corresponding to the setting which is registered in association with the button.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 depicts a view illustrating an example of a button editing screen for setting and editing buttons when a transmission type is "file".

FIG. 6 depicts a view illustrating an example of a keyword setting screen that is displayed by a "keyword character string setting" button of FIG. 5 being pressed.

FIG. 7 depicts a view illustrating an example of an address selection screen that is displayed by a "select from address book" button of FIG. 5 being pressed.

FIGS. 13A through 13C depict views for describing screen transitions when transmitting image data of an original read by a scanner, in a conventional image forming apparatus.

FIGS. 15A and 15B are flowcharts for describing processing accompanying the screen transition of FIG. 14, by the image forming apparatus according to the embodiment.

FIG. 18A depicts a view for describing a base folder that is created by the image forming apparatus according to the embodiment.

FIG. 18B depicts a view for describing a base file name that is created by the image forming apparatus according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Embodiment

First, explanation is given regarding an embodiment of the present invention.

Figure 1:
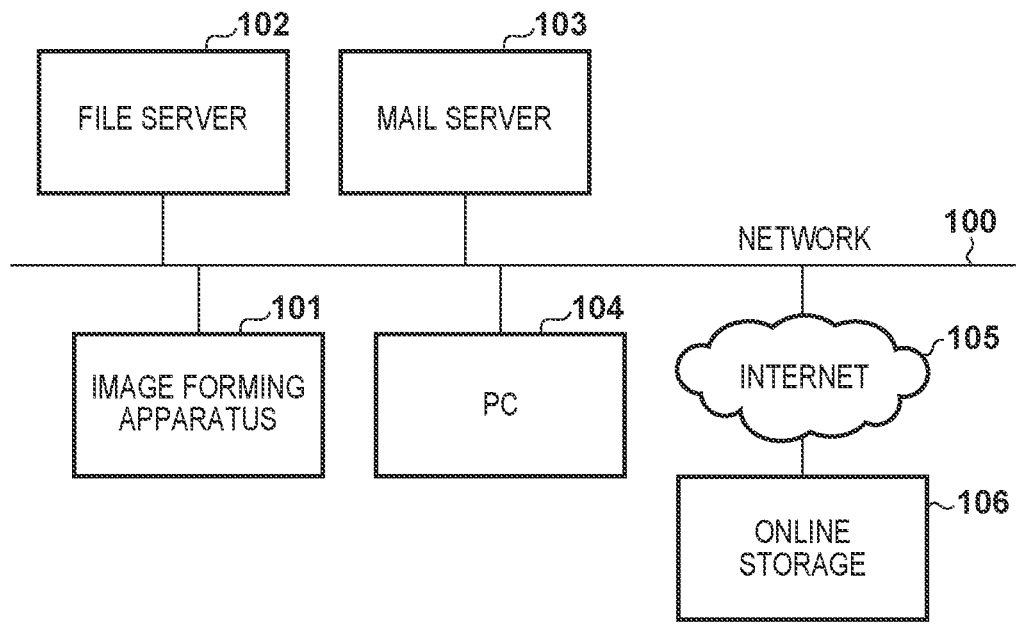
FIG. 1 depicts a view for describing a system configuration according to an embodiment.

FIG. 1 depicts a view for describing a system configuration according to the embodiment.

In the embodiment, an image forming apparatus 101 is given as an example of an information processing apparatus, and a file server 102, a mail server 103, and an online storage 106 are given as examples of destinations. The image forming apparatus 101, the file server 102, the mail server 103, and a PC 104 are connected to a network 100 so that they can communicate with each other. The network 100 and the Internet 105 are also connected, and the image forming apparatus 101 and the online storage 106 can communicate with each other via this connection.

The image forming apparatus 101 can transmit image data, which is obtained by scanning an original, to the file server 102, the mail server 103, and the online storage 106. The file server 102 is a file server that supports an FTP or SMB protocol. The mail server 103 is a mail server that supports an SMTP protocol. The online storage 106 supports WebDAV (a file sharing protocol that uses an HTTP protocol). The PC 104 can refer to or update a setting value of the image forming apparatus 101 by an HTTP protocol. The network 100 may have a configuration in which connections are made wirelessly by an access point (not shown), as long as image data can be transmitted thereon.

Image data in the embodiment is digital data. Specifically, image data is not limited to digital data that results from converting an image to raw data, and may be digital data in accordance with an image format such as TIFF or JPEG, and may be digital data in accordance with a PDF format.

Figure 2:
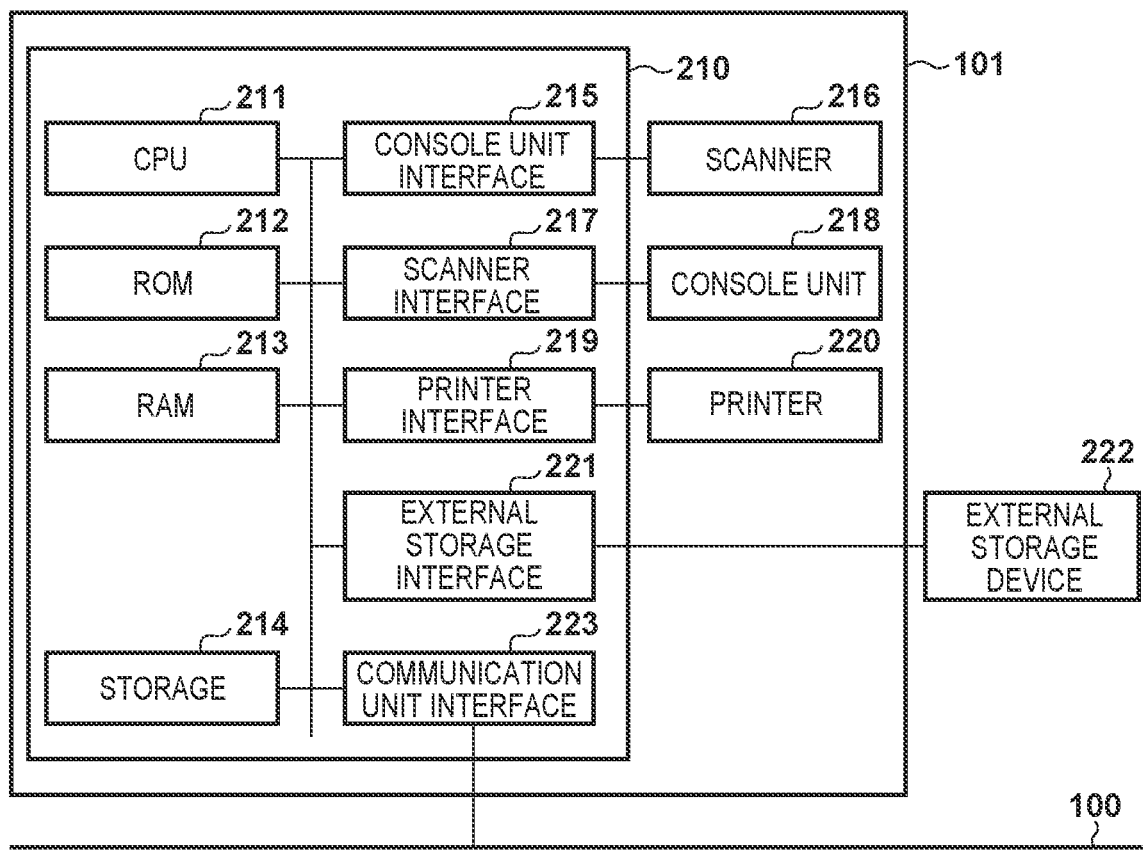
FIG. 2 is a block diagram for describing a hardware configuration of an image forming apparatus according to the embodiment.

FIG. 2 is a block diagram for describing a hardware configuration of the image forming apparatus 101 according to the embodiment.

A control unit 210 that includes a CPU 211 controls operation of the image forming apparatus 101 as a whole. The CPU 211 performs various controls such as reading control or print control by deploying a control program stored in a ROM 212 or a storage 214 to a RAM 213, and then executing the deployed program. The ROM 212 stores the control program which can be executed by the CPU 211. In addition, the ROM 212 stores a boot program, font data, or the like. The RAM 213 is a main memory of the CPU 211, and is used as a work area and a temporary storage area for deploying various control programs stored in the ROM 212 and the storage 214. The storage 214 stores image data, print data, an address book, various programs, and various pieces of setting information. In the embodiment, a flash memory is envisioned as the storage 214, but configuration may be taken to use an auxiliary storage apparatus such as an SSD, an HDD, an eMMC, for example.

Note that, for the image forming apparatus 101, while it is envisioned that one CPU 211 uses one memory (the RAM 213) to execute various processing indicated in flowcharts described later, another configuration may be taken. For example, it is possible to execute various processing illustrated in the flowcharts described later by causing a plurality of CPUs, RAMs, ROMs, and storages to cooperate. In addition, configuration may be taken so as to execute some of the processing by using a hardware circuit such as an ASIC or an FPGA.

A console unit I/F 215 connects a console unit 218 with the control unit 210. The console unit 218 displays information to a user, and detects an input from a user. A scanner interface 217 connects a scanner 216 with the control unit 210. The scanner 216 reads an image of the original, and converts the image to image data such as binary data. Image data generated by the scanner 216 is transmitted to an external apparatus, saved to an external storage device 222, or printed on a printing medium. A printer interface 219 connects a printer 220 with the control unit 210. The CPU 211 causes image data to be printed (print target image data) to be printed by transferring it to the printer 220 via the printer interface 219. The printer 220 prints an image on a printing medium fed from a feed cassette (not shown).

An external storage interface 221 connects the external storage device 222 with the control unit 210. The CPU 211 saves image data in the external storage device 222 via the external storage interface 221. In the embodiment, a USB interface is envisioned as the external storage interface 221 and a USB memory is envisioned as the external storage device 222, but an external storage device such as an SD card may be used. The control unit 210 is connected to the network 100 by a communication unit interface 223. The communication unit interface 223 can perform transmission of image data to the file server 102, transmission of an email to the mail server 103, transmission of image data to the online storage 106, and transmission of various pieces of setting information inside the image forming apparatus to the PC 104. In addition, the communication unit interface 223 can read or change various pieces of setting information of the storage 214 upon receiving a reference request or a change request for various pieces of setting information in the image forming apparatus 101 from the PC 104. Transmission of image data is performed by using a protocol such as FTP, SMB, WebDAV, or SMTP. In addition, transmission of various setting information to the PC 104 or receipt of a change of various setting information from the PC 104 is performed by a Web server application that processes HTTP.

Figure 3:
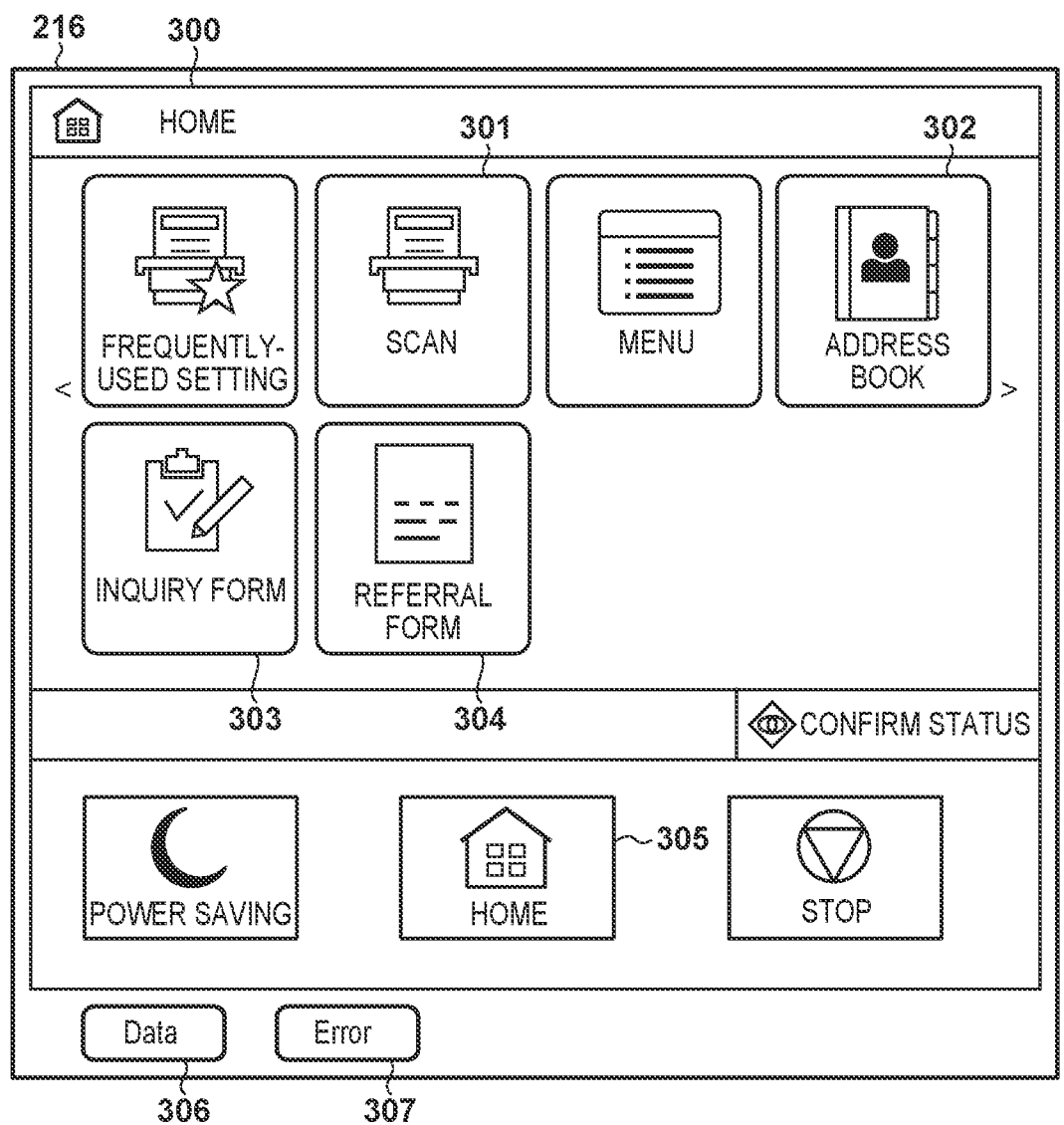
FIG. 3 depicts a view illustrating a state where a home screen is displayed in a console unit of the image forming apparatus according to the embodiment.

FIG. 3 depicts a view illustrating a state where a home screen is displayed in the console unit 218 of the image forming apparatus 101 according to embodiments.

The console unit 218 has a touch panel 300, a data LED 306, and an error LED 307. A home screen, which is displayed immediately after activation of the image forming apparatus 101, is displayed on the touch panel 300. The home screen is for a user to instruct the execution of each function of the image forming apparatus 101. The home screen displays buttons for instructing respective functions that the image forming apparatus 101 executes, such as a frequently-used setting button, a scan button 301, a menu button, an address book button 302, an inquiry form button 303, and a referral form button 304. The scan button 301 is for causing the execution of an electronic mail transmission of image data obtained by the scanner 216, file transmission of image data, or saving of image data to a USB memory (the external storage device 222). The address book button 302 is for causing an address book management screen (not shown) to be displayed. Via the address book management screen, a user can, for each destination, save settings relating to destination information to which to make a transmission. The destination information includes a transmission type (electronic mail transmission, SMB transmission, FTP transmission, or WebDAV transmission), a name, and information about the destination (an email address, a host name, server information, or the like), or the like. The inquiry form button 303 and the referral form button 304 are one-touch transmission buttons. A one-touch transmission button, upon being pressed, makes an instruction to read an original in accordance with the scanner 216 and transmit image data by settings that are decided in advance. A home button 305 is for causing the home screen to be displayed. The home button 305 is always displayed on the console unit 218. The data LED 306 and the error LED 307 are for notifying a user of a state of the image forming apparatus 101. The data LED 306 lights during execution of an email or a file transmission job, and the error LED 307 lights when some kind of error has occurred in the image forming apparatus 101.

FIG. 4 through FIG. 9 depict views illustrating examples of screens that are displayed by an application executed on the PC 104 according to the embodiment, and are for making settings for managing the one-touch buttons of the image forming apparatus 101. The screens illustrated in FIG. 4 through FIG. 9 are displayed by a display apparatus (not shown) having a touch panel function of the PC 104, by the PC 104 making an HTTP connection to the image forming apparatus 101 through a browser.

Figure 4:
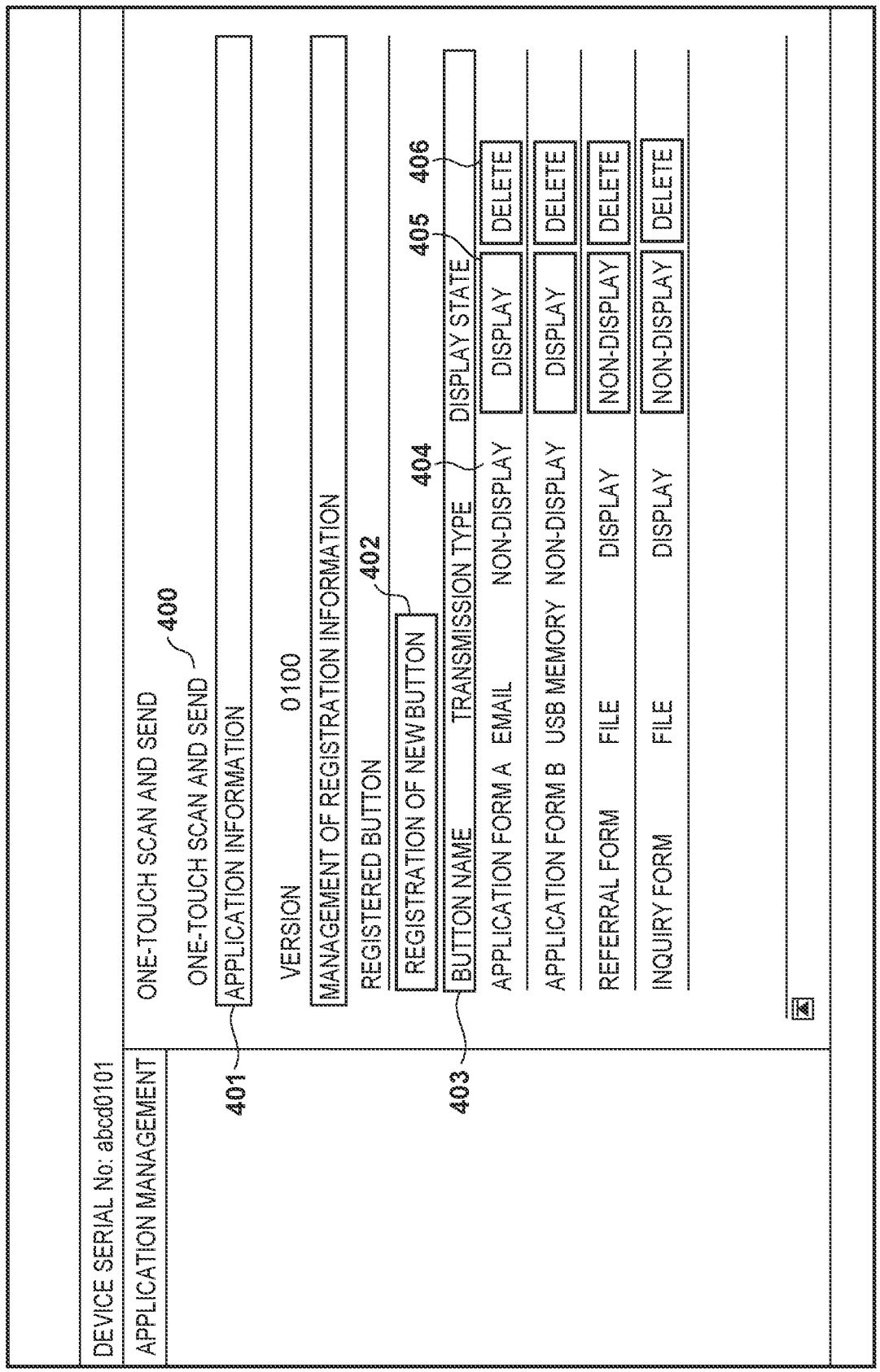
FIG. 4 depicts a view illustrating an example of an application management screen.

FIG. 4 illustrates an example of an application management screen.

An application name 400 is an area for displaying an application name, and the name "one-touch scan and send" is displayed here. This "one-touch scan and send" is an application for reading an original based on settings that have been decided in advance, and transmitting image data obtained by the reading a document. It is possible to register a plurality of such buttons that have respectively different settings.

Application information 401 is an area for displaying a version of this application, and the version "1.00" is displayed here. A "registration of new button" 402 is a button for generating a button that executes a one-touch scan and send. When a user presses the "registration of new button" 402, a button editing screen illustrated in FIG. 5 is displayed. A button information area 403 is an area for displaying button names, transmission types, and display states, and information of registered one-touch transmission buttons is displayed therein. The display state includes a button display setting 404, a display/non-display switching button 405, and delete button 406.

For the button name, a button name 501 set by the button editing screen of FIG. 5 is displayed. The transmission type is an area for displaying a transmission type set for a one-touch transmission button. For the transmission type, a transmission type 506 set by the button editing screen of FIG. 5 is displayed. The button display setting 404 displays whether or not the button is displayed on the touch panel 300. When the button display setting 404 is "display", a button is displayed on the touch panel 300 as illustrated in FIG. 3. When the button display setting 404 is "non-display", the button is not displayed on the touch panel 300. The display/non-display switching button 405 allows "display" and "non-display" of the button to be selectively toggled. When the display/non-display switching button 405 is pressed, display of the button display setting 404 switches. The delete button 406 is a button for deleting the button.

In FIG. 4, four buttons have been registered, with the button names "application form A", "application form B", "referral form", and "inquiry form". Because the button display setting 404 is "display" for "referral form" and "inquiry form", buttons are displayed on the touch panel 300 as illustrated on FIG. 3. However, because the button display setting 404 is "non-display" for "application form A" and "application form B", buttons are not displayed on the touch panel 300 as illustrated on FIG. 3.

FIG. 5 depicts a view illustrating an example of a button editing screen for setting and editing buttons when the transmission type 506 is "file".

An OK button 512 is for finalizing button settings with details set by this button setting editing screen. When the OK button 512 is pressed, information set on this screen is saved to the storage 214. A cancel button 513 is for discarding settings on this screen. When the OK button 512 or the cancel button 513 is pressed, FIG. 4 is returned to.

The button name 501 is an edit box for setting a button name. Here, "referral form" is displayed. A file name 502 is a list box for selecting a method of naming a file name, and either "button name" or "automatic" can be selected. A user selects "button name" in a case of reflecting the button name set by the button name 501 to a file name. A user selects "automatic" in a case of having the file name be automatically decided.

A checkbox 503 and a "keyword character string setting" button 504 are settings relating to a keyword (identification information) for a time of file output. When the checkbox 503 is checked, a keyword is enabled for a time of file output. The "keyword character string setting" button 504 is for setting a keyword for a time of file output, and when the button 504 is pressed, a screen for setting a keyword character string which is illustrated in FIG. 6 is displayed.

An allocation 505 is a list box for selecting a method of using a keyword set by the keyword setting screen of FIG. 6. For the allocation 505, it is possible to select one of "no allocation", "allocate (file)", "allocate (folder)", and "allocate (file and folder)". When "no allocation" is selected, the keyword is not used. When "allocate (file)" is selected, the keyword is included in an output file name. When "allocate (folder)" is selected, the keyword is included in a folder name for outputting the file. When "allocate (file and folder)" is selected, the keyword is included in a file name and the folder name to which file is outputted to.

Figure 8:
FIG. 8 depicts a view illustrating an example of a button editing screen for setting and editing buttons when a transmission type is "email".
Figure 9:
FIG. 9 depicts a view illustrating an example of a button editing screen for setting and editing buttons when a transmission type is "USB memory".

A transmission type 506 and a switching button 507 are settings (output settings) relating to a transmission method. The transmission type 506 is a list box for selecting a transmission type. For the transmission type 506, one of "file", "email", and "USB memory" can be selected. "File" is selected in a case of a file transmission that uses a file transmission protocol such as SMB, FTP, or WebDAV. "Email" is selected in a case of transmitting by using SMTP which is an email transmission protocol. "USB memory" is selected in a case of saving to a USB memory (the external storage device 222) which is mounted to the image forming apparatus 101. The switching button 507 is for deciding a transmission type. When the switching button 507 is pressed, display items for transmission settings 508 changes in accordance with the setting selected by the transmission type 506. When the transmission type 506 is "file", transmission settings as illustrated by FIG. 5 are displayed. When the transmission type 506 is "email", transmission settings as illustrated by FIG. 8 are displayed. In addition, when the transmission type 506 is "USB memory", transmission settings as illustrated by FIG. 9 are displayed.

The transmission settings 508 of FIG. 5 are setting items necessary for "file" transmission. There are a plurality of setting items, but description is given by focusing on items related to the embodiment.

A destination 509 and a "select from address book" button 510 are for instructing settings relating to a destination. The destination 509 is an uneditable text display area, and displays a destination selected by using the "select from address book" button 510. The "select from address book" button 510 is for setting a destination from an address book of the image forming apparatus 101. When the "select from address book" button 510 is pressed, an address selection screen illustrated in FIG. 7 is displayed. A file format 511 is a setting item relating to a format of image data. The image data is converted to digital data in a format in accordance with the setting of the file format 511 (PDF here).

FIG. 6 depicts a view illustrating an example of a keyword setting screen that is displayed by the "keyword character string setting" button 504 of FIG. 5 being pressed.

An OK button 601 is for finalizing button settings with details set by this keyword setting screen. A cancel button 602 is for discarding setting content. When the OK button 601 or the cancel button 602 is pressed, the screen of FIG. 6 returns to the screen of FIG. 5.

A character type 603 is a list box for selecting the character type of a keyword. For the character type 603, it is possible to select one out of "only numbers" and "alphanumeric". The number of characters 604 is an edit box for setting the number of characters of a keyword character string. The maximum number of characters that can be set is 16 characters. Display when inputting 605 is an edit box for setting a character string to display when a keyword character string is being inputted. The maximum number of characters that can be set is 64 characters.

FIG. 7 depicts a view illustrating an example of an address selection screen that is displayed when the "select from address book" button 510 of FIG. 5 is pressed.

An OK button 701 is for finalizing address selection with details set by this the address selection screen. A cancel button 702 is for discarding details set by this address selection screen. When the OK button 701 or the cancel button 702 is pressed, the screen of FIG. 5 is returned to. Note that, when the OK button 701 is pressed, the selected address is reflected to the destination 509 of FIG. 5.

A type 703 and a display switching button 704 are for deciding an address book for address selection to be performed. The type 703 is a list box, and it is possible to select one out of "best members" and "speed-dial" (not shown). "Best members" and "speed-dial" (not shown) are both address books, and addresses such as an email address or a file upload destination (a server name and a folder) are registered therein. The display switching button 704 is for deciding an address book with which address selection is performed. When the display switching button 704 is pressed, an address book name 705 selected by the type 703 is displayed. In addition, a list of addresses 706 for the address book for the address book name 705 is displayed.

The address book name 705 is a display area in which the name of an address book is displayed, and "best members" is displayed here. The list of addresses 706 is an area in which a list of addresses registered in the "best members" address book are displayed, and information of each address is configured by "selection", "number", "type", "name", and "destination". "Selection" of a respective address is made in in accordance with a checkbox provided for the respective address. However, the checkbox is displayed by one of two types: a checkable checkbox and an uncheckable checkbox. For "number", a management number of the address is displayed. "Type" is an area in which an icon is displayed, and the icon differs in accordance with the type of the address. For "name", a name added to the address is displayed. For "destination", an address is displayed.

Next, additional information will be given for the display of checkable checkboxes and uncheckable checkboxes.

FIG. 7 illustrates a state in which "file" has been selected by the transmission type 506 of FIG. 5. FIG. 7 illustrates a display example for a case of selecting an address from the "best members" address book in which two addresses whose transmission type is "email" and two addresses whose transmission type is "file" are registered. Checkable checkboxes are displayed for addresses whose type matches the transmission type 506. Specifically, uncheckable checkboxes are display for the number "01" and the number "02" addresses because the transmission type 506 is "file" in FIG. 5, and checkable checkboxes are display for the number "03" and the number "04" addresses.

Based on the above description, a summary of setting the "referral form" button 304 in the embodiment is as follows. For the "referral form" button, in FIG. 5 the button name 501 is "referral form", the file name 502 is "button name", and the checkbox 503 is checked and a keyword has been set. The allocation 505 is set to "allocate (file and folder)" is set, and the transmission type 506 is set to "file". Furthermore, with regard to the keyword, in FIG. 6 the character type 603 is set to "only numbers", the number of characters 604 is set to "7", and the display when inputting 605 is set to "Please input patient number". Furthermore, for the "referral form"

button 304, the destination for the number "03" is set to "¥¥file server¥referral form" in FIG. 7.

FIG. 8 depicts a view illustrating an example of a button editing screen for setting and editing buttons when the transmission type 506 is "email". This screen is displayed in accordance with the switching button 507 being pressed in the screen of FIG. 5. With FIG. 8, description is given by taking setting of an "application form A" button as an example.

An OK button 801, a cancel button 802, and the transmission type 506 are similar to those in FIG. 5, and thus description thereof is omitted. The transmission settings 508 are setting items necessary for "email" transmission. There are a plurality of setting items, but description is given by focusing on items related to the embodiment. A destination 803, an addition button 804, a destination list 805, a "select from address book" button 806, a "switching of TO/CC/BCC" button 807, and a delete button 808 are setting relating to a destination in the case where the transmission type 506 is "email".

The destination 803 and the addition button 804 are used in a case of setting a new destination to the destination list 805. The destination 803 is an edit box, and it is possible to input an email address in accordance with a keyboard (not shown) of the PC 104. The addition button 804 is pressed in a case of setting, to the destination list 805, an email address inputted to the destination 803.

The destination list 805 is a text display area that allows selection in units of email addresses. The destination list 805 displays a field name for a time of an e-mail transmission, and an email address. For the field name at a time of an e-mail transmission, one of "To", "Cc", or "Bcc" is displayed. Note that an initial value for the field name for when an email address is to be added to the destination list 805 is "To".

The "select from address book" button 806 is pressed in a case of selecting an address from an address book. When the "select from address book" button 806 is pressed, an address selection screen (FIG. 7) is displayed. When an address is selected by the address book selection screen (FIG. 7), it is displayed in the destination list 805 which is for displaying a list of destinations.

The "switching of TO/CC/BCC" button 807 is pressed in a case of changing the field name. It is possible to cyclically change the initial value of the field name in the order of To→Cc→Bcc→To when an address is selected by the destination list 805 and the "switching of TO/CC/BCC" button 807 is pressed.

The delete button 808 is for deleting a selected address from the destination list 805. When an address is selected from the destination list 805 and the delete button 808 is pressed, the selected address is deleted from the destination list 805. A file format 809 is similar to the file format 511 of FIG. 5, and therefore description thereof is omitted.

FIG. 9 depicts a view illustrating an example of a button editing screen for setting and editing buttons when the transmission type 506 is "USB memory". With FIG. 9, description is given by taking setting of an "application form B" button as an example.

The OK button 801, the cancel button 802, and the transmission type 506 are similar to those in FIG. 5 and FIG. 8, and thus description thereof is omitted. The transmission settings 508 are setting items necessary for "USB memory" transmission. There are a plurality of setting items, but description is given by focusing on items related to the embodiment. When the transmission type 506 is "USB memory", image data is saved in a USB memory (the external storage device 222). Accordingly, settings regarding a destination are not displayed for the transmission settings 508. A file format 901 is similar to the file format 511 of FIG. 5, and therefore description thereof is omitted.

Figure 10:
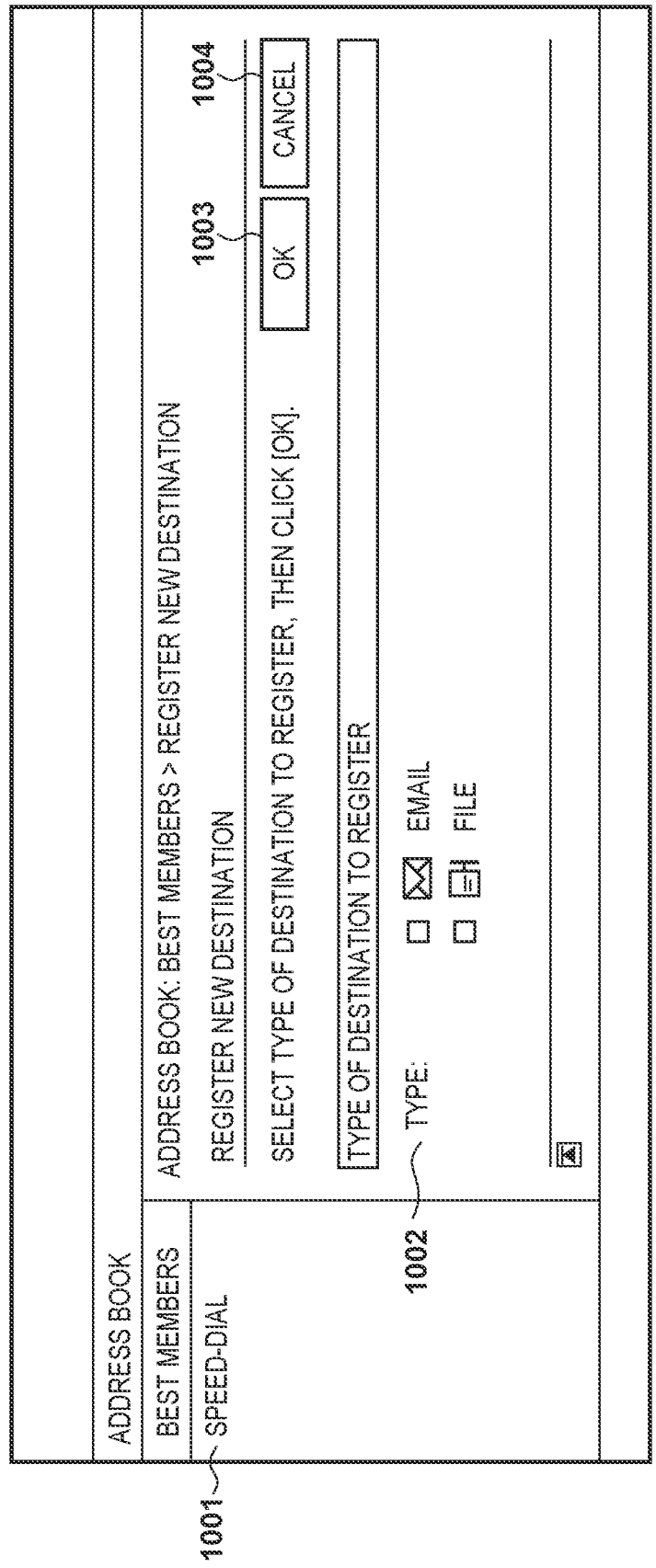
FIG. 10 depicts a view illustrating an example of a screen for registering a new address to a best members address book.
Figure 11:
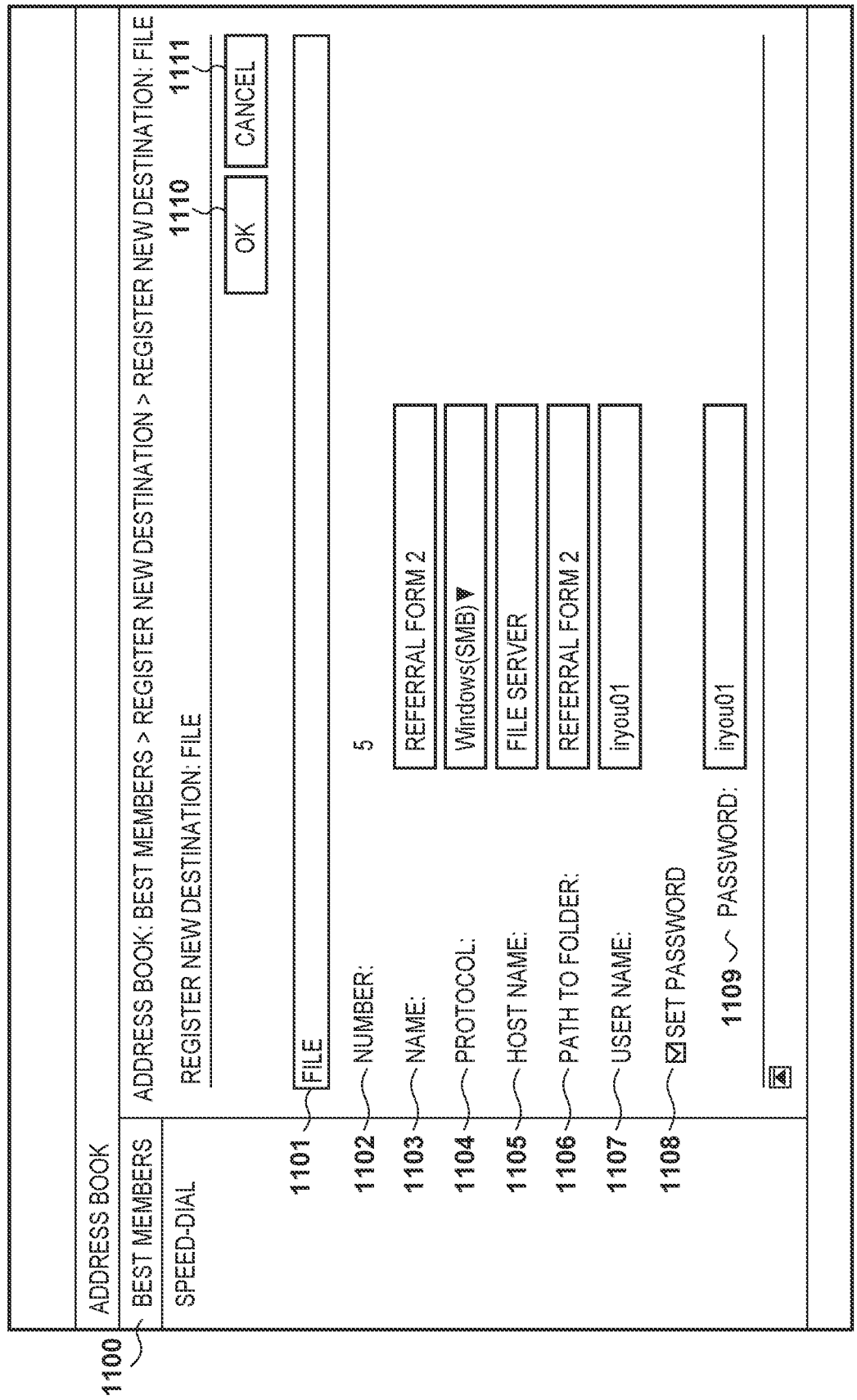
FIG. 11 depicts a view illustrating an example of an address registration screen when a destination type in the screen of FIG. 10 is set to "file".
Figure 12:
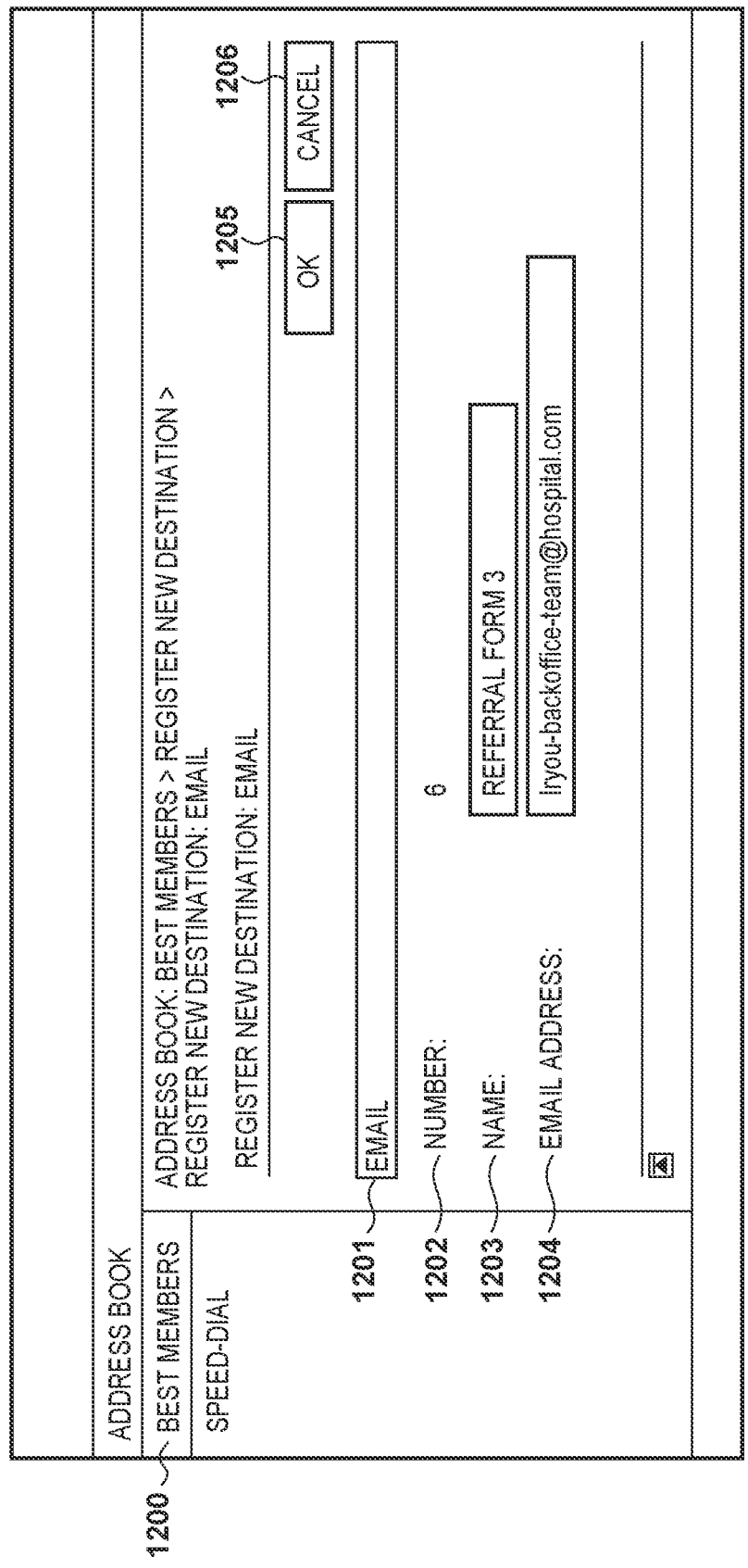
FIG. 12 depicts a view illustrating an example of an address registration screen when a destination type in the screen of FIG. 10 is set to "email".

FIG. 10, FIG. 11, and FIG. 12 depicts views respectively illustrating examples of address registration screens. The screens are displayed by a display apparatus (not shown) of the PC 104, by the PC 104 making an HTTP connection to the image forming apparatus 101 through a browser.

FIG. 10 depicts a view illustrating an example of a screen for registering a new address to the best members address book.

The address book selection area 1001 is for selecting an address book for registering an address. The address book selection area 1001 displays two address books: "best members" and "speed-dial", and it is possible to select one of these. Description is given with "best members" having been selected as the address book in FIG. 10, FIG. 11, and FIG. 12.

A "type of destination to be registered" 1002 is an area for selecting the type of address to be registered. In FIG. 10, one of "email" and "file" can be selected, and this selection is performed by radio buttons. An OK button 1003 is pressed at a time for inputting detailed information of an address. When the OK button 1003 is pressed in a state where "file" is selected, the screen of FIG. 11 is displayed. When the OK button 1003 is pressed in a state where "email" is selected, the screen of FIG. 12 is displayed. A cancel button 1004 is pressed when cancelling address book registration, discarding the setting content.

FIG. 11 depicts a view illustrating an example of an address registration screen when a destination (an output destination) type in the screen of FIG. 10 is set to "file".

An address book display area 1100 is for displaying an address book for registering an address. In FIG. 11, "best members" is selected. Reference numeral 1101 is an area for setting advanced settings for a file. File advanced settings 1101 includes settings for reference numerals 1102 through 1109.

A number 1102 is a unique management number for the "best members" address book. A name 1103 is an edit box for setting a name of an address, and "referral form 2" is set here. A protocol 1104 is a list box, and is for selecting a protocol to use for transmission. For the protocol 1104, it is possible to select one type from SMB, FTP, and WebDAV. In FIG. 11, SMB is selected. A host name 1105 is an edit box for setting a host name to transmit to. An IP address or a server name that can be resolved to an IP address is inputted. "File server" is designated here. A "path to folder" 1106 is an edit box for designating which folder of the server designated by the host name 1105 to set as a destination, and a folder "referral form 2" is designated here. A user name 1107 is an edit box for setting a user name for accessing the server designated by the host name 1105. "iryou01" is designated here. A checkbox 1108 is checked in a case of using a password when accessing the server designated by the host name 1105. When the checkbox 1108 is checked, the password set by a password 1109 is used when accessing the server designated by the host name 1105. The password 1109 is an edit box for setting a password for accessing the server designated by the host name 1105. An OK button 1110 is for finalizing button settings with content set by this screen. When the OK button 1110 is pressed, finalized settings are saved in the storage 214 of the image forming apparatus 101. A cancel button 1111 is for discarding setting content.

FIG. 12 depicts a view illustrating an example of an address registration screen when a destination type in the screen of FIG. 10 is set to "email".

An address book display area 1200 is for displaying an address book for registering an address. In FIG. 12, "best members" is selected. Reference numeral 1201 denotes an area for setting advanced settings for an email. Reference numeral 1201 includes settings for reference numerals 1202 through 1204. A number 1202 is a unique management number for the "best members" address book. A name 1203 is an edit box for setting a name of an address, and "referral form 2" is set here. An email address 1204 is an edit box for setting an email address to transmit to. An OK button 1205 is for finalizing button settings with content set by this screen. When the OK button 1205 is pressed, content set by this screen is saved to the storage 214 of the image forming apparatus 101. A cancel button 1206 is for discarding details set by this screen.

Figure 13B:
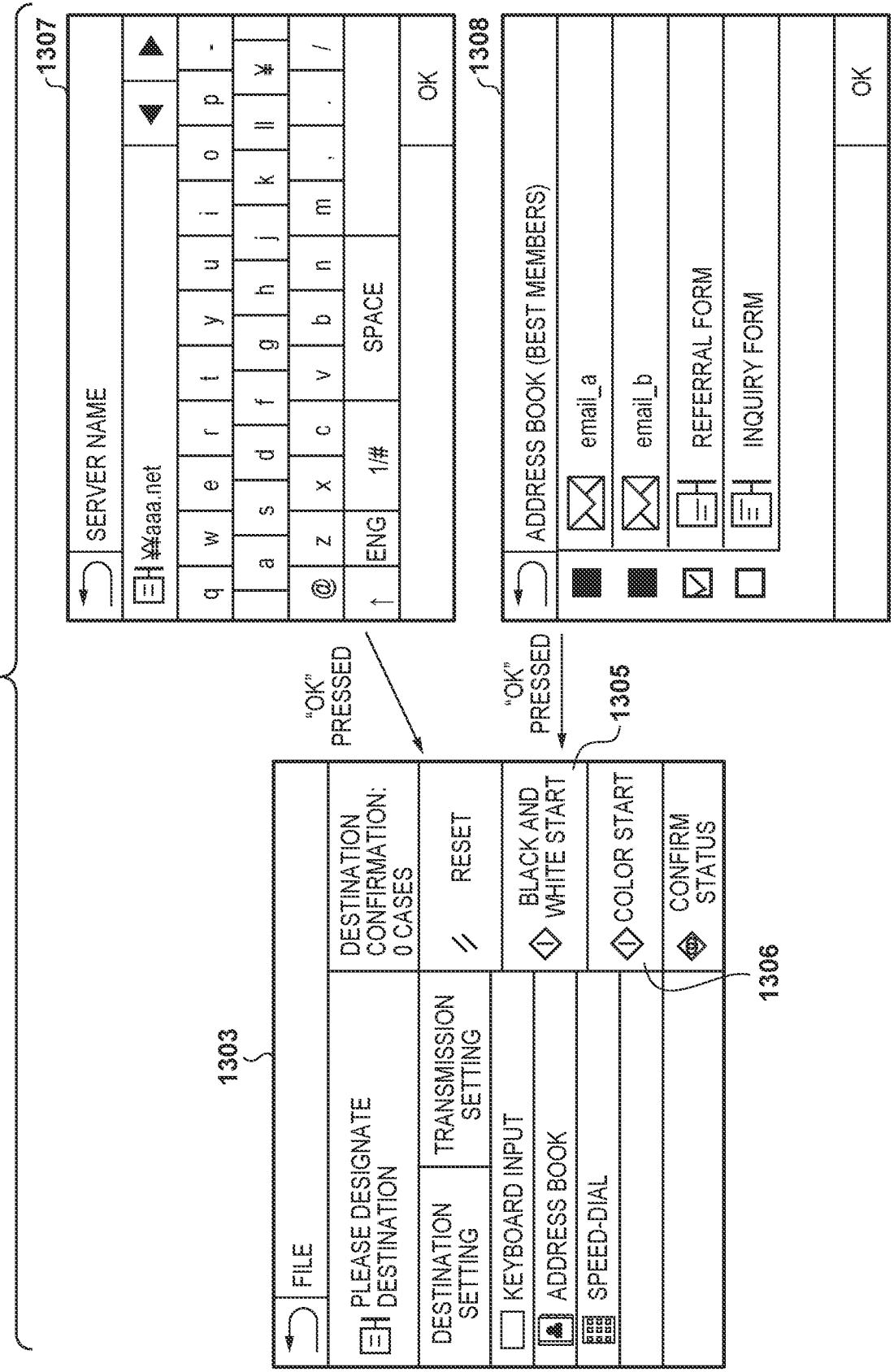
Figure 13C:
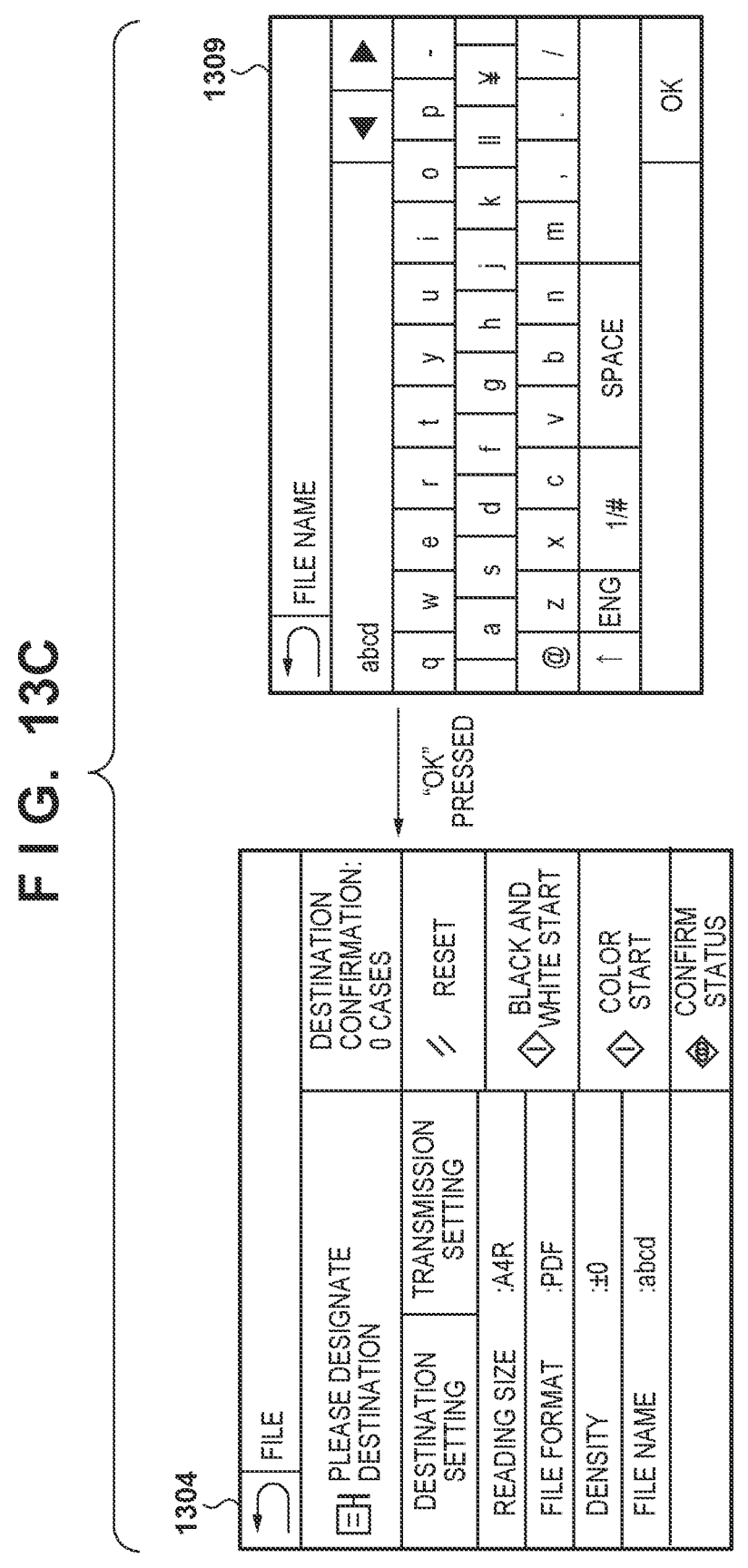

FIGS. 13A through 13C are views for describing screen transitions when transmitting image data of an original read by a scanner, in a conventional image forming apparatus. Screens illustrated by FIGS. 13A-13C are displayed on a touch panel of the image forming apparatus.

A user presses a scan button 301 of a home screen 1301 after setting the original on the scanner. Thereupon a screen 1302 for selecting a scan type is displayed. The screen 1302 for selecting a scan type displays three options: "email", "file", and "USB memory". The user selects "USB memory" in a case of desiring to save the image data to a USB memory (the external storage device 222). The user selects "email" in a case of desiring to transmit the image data by email to the mail server 103. In addition, the user selects "file" in a case of desiring to transmit the image data to the file server 102 or the online storage 106. In FIGS. 13A-13C, description is given assuming that the user has selected "file".

When a user selects "file" in the screen 1302, a screen 1303 in FIG. 13B for designating a destination is displayed. The screen 1303, which is for designating a destination, includes "destination settings" and "transmission settings", and settings regarding a destination are performed by "destination settings". In "transmission settings", settings relating to image data, such as a size for reading an original or a format of image data, are performed.

In the screen 1303, it is possible to use a keyboard to input a setting regarding a destination, or select a destination from an address book. A keyboard screen 1307 is displayed when "keyboard input" is selected in the screen 1303, and a user can use a keyboard displayed on the screen 1307 to input a destination. In a case of using the keyboard to designate a destination, settings for the protocol 1104, the "path to folder" 1106, the user name 1107, and the password 1109 of FIG. 11 are performed, but description of such is omitted in FIGS. 13A-13C.

In contrast, an address book screen 1308 is displayed when "address book" is selected in the screen 1303, and a user can designate a destination by selecting a desired address book from a list of address books displayed on the screen 1308.

When "transmission settings" is selected in the screen 1303, a "transmission settings" screen 1304 in FIG. 13C is displayed. In the screen 1304, it is possible to set "reading size", "file format", "density" and "file name". A keyboard screen 1309 is displayed when "file name" is selected, and a user can use a keyboard displayed on the screen 1309 to input a file name.

In the screen 1303, when a user designates a destination, pressing of a "black and white start" button 1305 or a "color start" button 1306 is enabled. The "black and white start" button 1305 is pressed when converting an original into image data as grayscale, and the "color start" button 1306 is pressed when converting the original into digital data with color. When a user designates a destination on a screen for designating a destination and presses the "black and white start" button 1305 or the "color start" button 1306, reading of the original is started by the scanner, and image data is transmitted to the designated destination.

In the screen transitions of FIGS. 13A-13C, it is necessary for a user to perform many screen operations for a case of transmitting image data with a file name to which a patient number has been added, or a case for transmitting image data by designating a folder for a patient number. For example, for a case of transmitting image data with a file name to which a patient number is added, a user must input the file name after performing a screen operation for displaying the "transmission settings" screen 1304. In addition, a case of transmitting image data after designating a folder for the patient number, it is necessary to use keyboard input to input a server name, a protocol, the folder for the patient number, a user name, and a password after performing the screen operation for displaying the screen 1303. Alternatively, it is necessary to generate an address for which a patient number is set in the "path to folder" 1106, by using the address book registration screen of FIG. 11. In any case, with the screen flow of FIGS. 13A-13C, high effort is incurred to set a destination or a file name that uses a patient number that differs for each patient.

Figure 14:
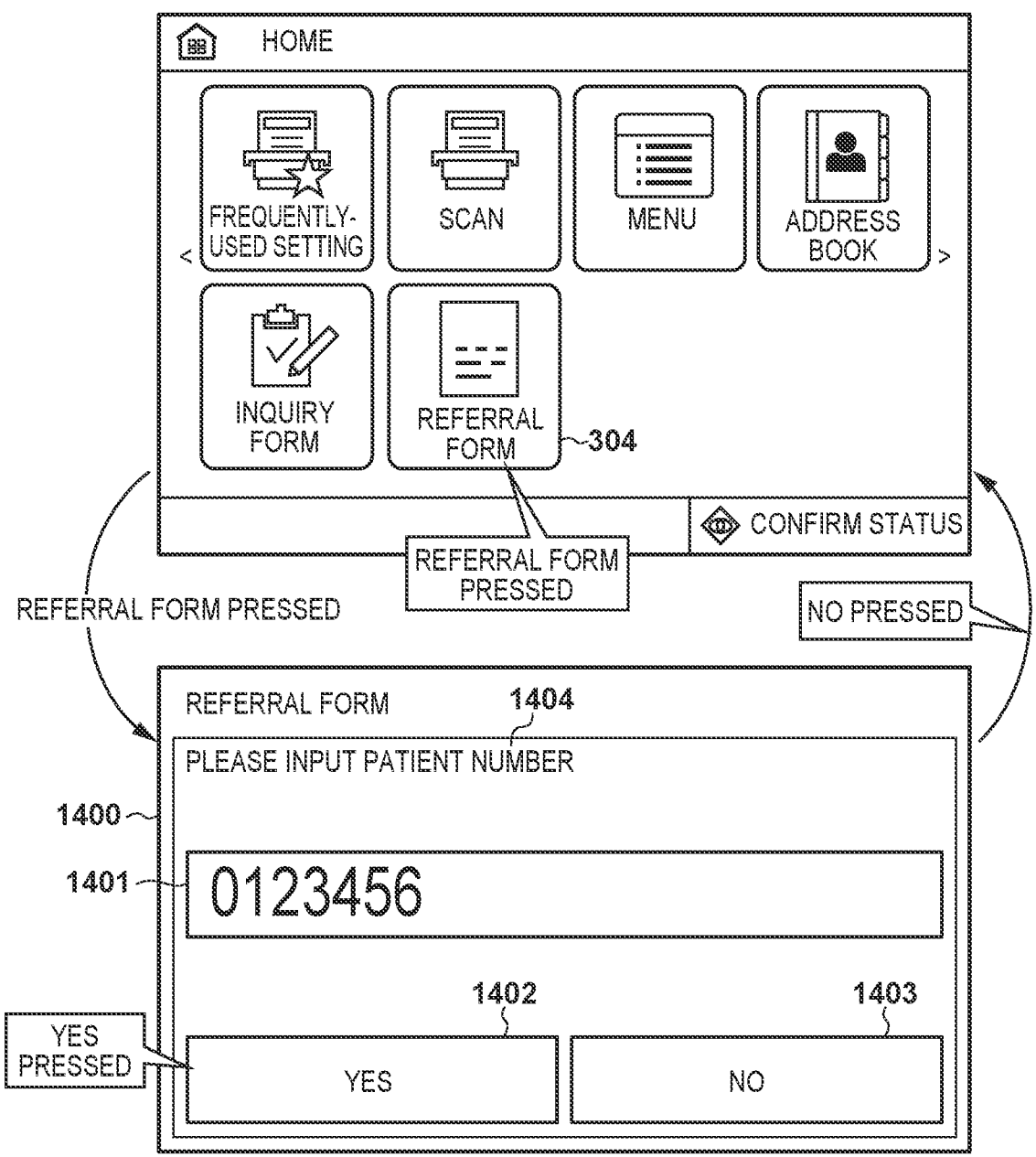
FIG. 14 depicts a view for describing a screen transition when a referral form button is pressed in the image forming apparatus according to the embodiment.

FIG. 14 depicts a view for describing a screen transition when the referral form button 304 is pressed in the image forming apparatus 101 according to the embodiment. Similarly to FIGS. 13A-13C, FIG. 14 depicts a view for describing a flow for a case of transmitting image data of an original that has been read by a scanner, and the screens illustrated in FIG. 14 are displayed on the touch panel 300 of the console unit 218.

A user presses the referral form button 304 of the home screen after setting the original on the scanner 216. Setting of the referral form button 304 is as described with reference to FIG. 4 through FIG. 9. When the referral form button 304 is pressed, a referral form button screen 1400 is displayed, and a message 1404 stating "please input patient number" which is set by "display when inputting" 605 of FIG. 6 and a patient number input box 1401 are displayed. When a user presses a "NO" button 1403, the home screen is returned to. When a user presses a "YES" button 1402, if the patient number ("0123456" in FIG. 14) satisfies conditions for the character type 603 and the number of characters 604, reading of an original by the scanner 216 is started, and subsequently image data of the original is transmitted. If the conditions are not met, reading of original is not started.

With such a configuration, as is clear from a comparison with the example of FIGS. 13A-13C, user effort when reading and registering a patient's referral form is greatly reduced.

FIGS. 15A and 15B are flowcharts for describing processing accompanying the screen transition of FIG. 14, by the image forming apparatus 101 according to the embodiment. Note that processing illustrated by the flowcharts is achieved by the CPU 211 executing a program that has been deployed to the RAM 213 from the ROM 212 or the storage 214.

FIG. 15A is a flowchart for describing processing as a whole for, by the referral form button 304 being pressed, reading an original (a referral form), and transmitting image data thereof to a designated destination.

Firstly, in step S1501, the CPU 211 determines whether or not a user has pressed the referral form button 304 of the home screen, and when the CPU 211 determines that the referral form button 304 has been pressed, the processing proceeds to step S1502, and otherwise the processing remains at step S1501. In step S1502, the CPU 211 displays the referral form button screen 1400 on the touch panel 300, and then the processing proceeds to step S1503. In step S1503, the CPU 211 determines whether or not a user has pressed the "NO" button 1403 on the referral form button screen 1400, and when the "NO" button 1403 is pressed the home screen is displayed on the touch panel 300, and the processing returns to step S1501. In contrast, when the "NO" button 1403 is not pressed, in other words, when a user presses the "YES" button 1402, the processing proceeds to step S1504, and it is determined whether or not a patient number has been input in the patient number input box 1401. At this point, it is determines whether or not the characters for the patient number inputted by the user ("0123456" in FIG. 14) satisfy the conditions of the character type 603 and the number of characters 604 of FIG. 6. When a patient number has been inputted and the conditions are satisfied, the processing proceeds to step S1505, but otherwise the processing returns to step S1503.

In step S1505, the CPU 211 causes the scanner 216 to read the original (a referral form) placed on the scanner 216, in accordance with read settings set in the button editing screen previously described, and then the processing proceeds to step S1506. In step S1506, the CPU 211 converts image data of the read original to an electronic file in accordance with various settings that were set in association with the "referral form" button 304, and then the processing proceeds to step S1507.

In step S1507, the CPU 211 executes processing for deciding folder and file configurations. Details of processing of step S1507 are described later with reference to the flowchart of FIG. 15B. Next, the processing proceeds to step S1508, and the CPU 211 transmits the file to a designated destination, in accordance with the settings that were set in association with the "referral form" button 304. When transmission completes in this way, this processing ends. The processing of step S1508 is described later with reference to the flowchart of FIG. 17.

FIG. 15B is a flowchart for describing processing for deciding a folder and file configuration of step S1507 of FIG. 15A.

In step S1510, the CPU 211 obtains the setting for the allocation 505 of FIG. 5, and the processing proceeds to step S1511. In step S1511, the CPU 211 determines whether or not the setting for the allocation 505 is "allocate (folder)" or "allocate (file and folder)", and if so the processing proceeds to step S1512, and if the setting is no allocation, the processing proceeds to step S1514. In step S1514, the CPU 211 decides a base folder as a root folder for a temporary save area of the storage 214 and the processing proceeds to step S1515.

In step S1512, the CPU 211 creates a folder having a folder name of the patient number ("0123456") inputted by the user in the root folder for the temporary save area of the storage 214, and then the processing proceeds to step S1513. Note that the root folder for the temporary save area is not the root folder of the file system of the storage 214. In the embodiment, description is given by assuming that ¥tmp of a file system is allocated as the root folder of the temporary area.

Next, the processing proceeds to step S1513, and the CPU 211 decides the folder having the folder name of the patient number ("0123456") created under the root folder of the temporary area as a base folder, and then the processing proceeds to step S1515. In step S1515, the CPU 211 decides the root folder of the temporary area as the base folder, and then the processing proceeds to step S1516. The detail of the processing of step S1515 is described later with reference to the flowchart of FIG. 16. In step S1516, the CPU 211 saves the image data in the base folder with the base file name, and then this processing ends. Here, the base folder is the folder that is the base for file transmission processing (step S1508) in the embodiment.

FIG. 18A depicts a view for describing a base folder that is created by the image forming apparatus 101 according to the embodiment.

When "folder allocation" is "no", the root folder of the temporary area is the base folder. In contrast, when "folder allocation" is "yes", a folder that has a folder name indicated by the patient number and is created in the root folder of the temporary area is the base folder. For example, in the example of FIG. 18A, the name of the base folder is "¥tmp¥0123456".

Figure 16:
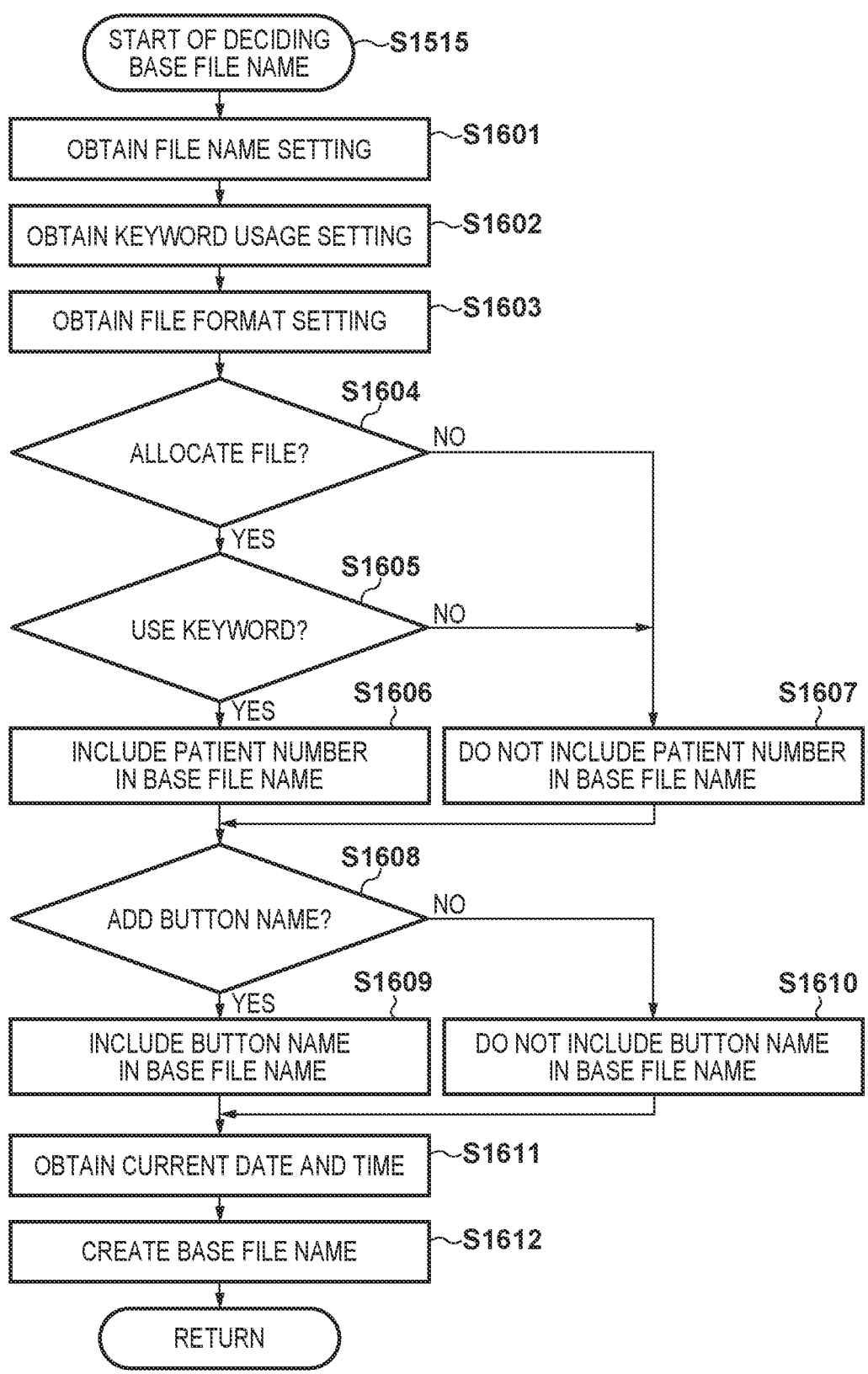
FIG. 16 is a flowchart for describing processing for deciding a base file name of step S1515 of FIG. 15B.

FIG. 16 is a flowchart for describing processing for deciding a base file name of step S1515 of FIG. 15B.

Firstly, in step S1601, the CPU 211 obtains the setting for the file name 502 of FIG. 5, and the processing proceeds to step S1602. In step S1602, the CPU 211 obtains the setting of the checkbox 503 which is for keyword usage, and then the processing proceeds to step S1603. In step S1603, the CPU 211 obtains a file format of the transmission settings 508, and the processing proceeds to step S1604. In the example of FIG. 5, the setting of the file name 502 is "button name", the checkbox 503 is checked, and "PDF" is set for the file format.

Next, the processing proceeds to step S1604, and the CPU 211 determines whether or not the setting for the allocation 505 is "allocate (file)" or "allocate (file and folder)", and if so the processing proceeds to step S1605. In contrast, when this is not the case the processing proceeds to step S1607. In step S1605, the CPU 211 determines whether or not there is a setting to use a keyword by the checkbox 503 being checked, and if that is the case the processing proceeds to step S1606, but otherwise the processing proceeds to step S1607. In step S1606, the CPU 211 allocates an area in the RAM 213 for an "include patient number" flag and sets this flag to indicate "yes", and then the processing proceeds to step S1608. In contrast, in step S1607 the CPU 211 allocates an area in the RAM 213 for an "include patient number" flag and sets this flag to indicate "no", and then the processing advances to step S1608.

In step S1608, the CPU 211 determines whether or not the setting of the file name 502 is "button name", and if that is the case the processing proceeds to step S1609, but otherwise the processing proceeds to step S1610. In step S1609, the CPU 211 allocates an area in the RAM 213 for an "include button name" flag and sets this flag to indicate "yes", and then the processing proceeds to step S1611. In contrast, in step S1610 the CPU 211 allocates an area in the RAM 213 for an "include button name" flag and sets this flag to indicate "no", and then the processing proceeds to step S1611.

In step S1611, the CPU 211 obtains the current date and time, and then the processing proceeds to step S1612. In the embodiment, description is given assuming that "2017, June 1, 12:00:00" is obtained. Next, the processing proceeds to step S1612, and the CPU 211 creates the base file name based on the above information.

Here, the base file name is decided based on the "include patient number" flag, the "include button name" flag, the file format of the transmission settings 508, and the current date and time.

FIG. 18B depicts a view for describing a base file name that is created by the image forming apparatus 101 according to the embodiment.

Here, the file name of a base file to be generated differs in accordance with respective settings of whether or not to "include patient number" and whether or not to "include button name" in the file name. When "include patient number" and "include button name" are both "no", the file name becomes a file name that includes the date and time when the file was created, as with reference numeral 1801, for example. In addition, when only "include patient number" is "yes", the file name becomes one where the patient number is added before the date and time, as with reference numeral 1802. Furthermore, when only "include button name" is "yes", the file name becomes one where the button name ("referral form") is added before the date and time, as with reference numeral 1803. In a case where "include patient number" and "include button name" are both "yes" as with reference numeral 1804, the file name becomes one where the patient number and the button name are added before the date and time.

Figure 17:
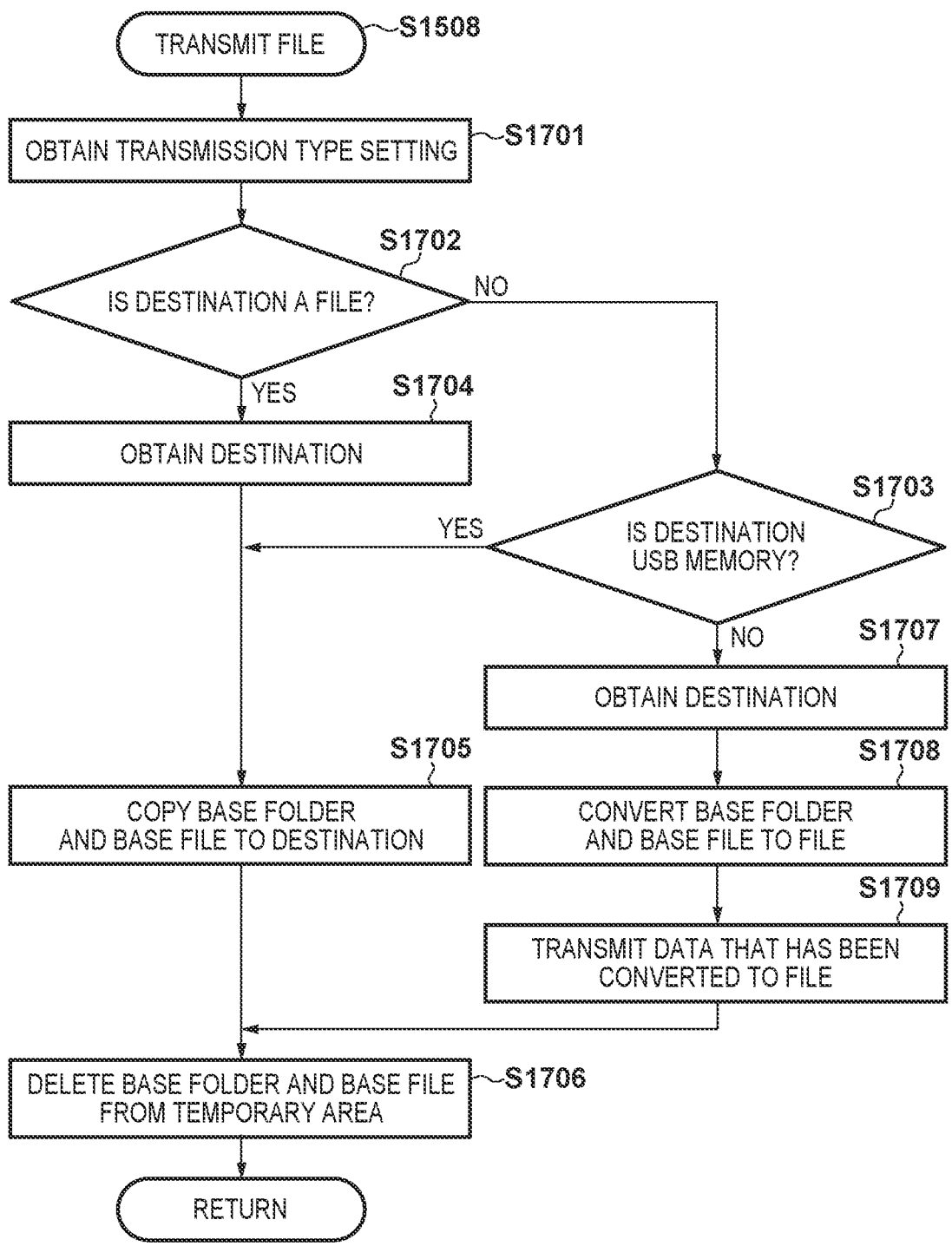
FIG. 17 is a flowchart for describing processing for file transmission of step S1508 of FIG. 15A.

FIG. 17 is a flowchart for describing processing for file transmission of step S1508 of FIG. 15A.

In step S1701, the CPU 211 obtains the setting for the transmission type 506, and the processing proceeds to step S1702. In step S1702, the CPU 211 determines whether or not the setting of the transmission type 506 is "file", and if that is the case, the processing proceeds to step S1704, but otherwise the processing proceeds to step S1703. In step S1703, the CPU 211 determines whether or not the setting of the transmission type 506 is "USB memory", and if that is the case, the processing proceeds to step S1705, but otherwise the processing proceeds to step S1707. In step S1704, the CPU 211 obtains the setting for the destination 509, and the processing proceeds to step S1705. In step S1705, if the destination is "file", the CPU 211, while maintaining the configuration of the base file and the base folder of the temporary save area of the storage 214, copies them to the destination via a network.

Specifically, in the case of the "referral form" button 304 of the embodiment, a folder with the folder name "0123456" is created in the directory "¥¥file server¥referral form", and "0123456_referral form_20170601120000.pdf" is copied there. Note that, when the destination is "USB memory", copying is performed to the root directory of the USB memory while maintaining the configuration of the base file and the base folder of the temporary save area of the storage 214. When the copying completes in this way, the processing proceeds to step S1706. In step S1706, the CPU 211 deletes the base file and the base folder of the temporary save area of the storage 214, and this processing ends.

In addition, step S1707 is for the case where the setting of the transmission type 506 is "email", and therefore the CPU 211 obtains the setting of the destination list 805 of FIG. 8, and the processing proceeds to step S1708. In step S1708, the CPU 211, maintaining the configuration of the base file and the base folder of the temporary save area of the storage 214, converts them into one file that can be attached to an email. For a case of converting them into one file, an archiver for ZIP or the like may be used to compress the size. When the processing for making one file in step S1708 completes, the processing proceeds to step S1709. In step S1709, the CPU 211 attaches to an email the file created in step S1708 that maintains the configuration of the base file and the base folder of the temporary save area, and transmits the email to the destination of the destination list 805. When the email transmission completes in this way, the processing proceeds to step S1706.

By virtue of the embodiment as described above, it is possible for a user to, by simply pressing a desired button and inputting predetermined information (for example, a patient number), read an original and execute processing for outputting obtained image data of an original to an output destination in a format that enables the image data to be easily managed. Specifically, it is possible to optimize work to convert an original to image data and manage the image data by automatically adding identification information inputted by a user to the name of a folder or a file name for the image data.

Note that, in the embodiment described above, various setting operations for a button setting or the like in the image forming apparatus 101 were given as being performed by the PC 104 remotely, but the present invention is not limited to this. For example, configuration may be taken to display screens as illustrated by FIG. 4 through FIG. 12 on a display unit of the console unit 218 of the image forming apparatus 101, and for a user to operate such screens to perform various settings described above.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-254396, filed Dec. 28, 2017, which is hereby incorporated by reference herein in its entirety.

What is claimed is:

1. An image processing apparatus that is able to display an object for which a transmission destination is set, the image processing apparatus comprising:
   a scanner that scans a document to generate image data;
   a communication interface; and
   a user interface that receives information from a user,
   wherein the user interface receives the information from the user after the object is selected, and the scanner scans the document after the user interface receives the information from the user,
   wherein, without receiving the information after the scanner scans the document, the communication interface transmits a file based on the image data generated by the scanner based on at least the transmission destination set for the object,
   wherein a file name of the file is determined based on the information which is received after the object is selected, and
   wherein the communication interface transmits the file to a transmission destination that is determined by adding the information which is received after the object is selected to the set transmission destination.

2. The image processing apparatus according to claim 1, wherein
   at least one scan setting is further set for the object, and
   wherein the scanner scans the document based on the at least one scan setting after the object is selected.

3. The image processing apparatus according to claim 2, wherein the scan setting includes at least one of a scan size, an orientation of the document and a scan density.

4. The image processing apparatus according to claim 1, further comprising:
   a processor that determines whether the information received by the user interface satisfies a predetermined condition,
   wherein the communication interface does not transmit the image data in a case where it is determined that the information received by the user interface does not satisfy the predetermined condition.

5. The image processing apparatus according to claim 4, wherein the predetermined condition is a number of characters included in the information to be received by the user interface.

6. The image processing apparatus according to claim 1, wherein the object is registered based on an instruction from an external apparatus which is able to communicate with the information processing apparatus.

7. The image processing apparatus according to claim 1, wherein the object is registered based on an instruction from the user interface.

8. A method of controlling an image processing apparatus having a scanner for scanning a document to generate image data, a communication interface and a user interface for receiving information from a user, that is able to display an object for which a transmission destination is set, the method comprising:
   scanning a document with the scanner after the user interface receives the information from the user after the object is selected; and
   transmitting, by the communication interface, a file based on the image data generated by the scanner based on at least the transmission destination set for the object without receiving the information after the scanner scans the document,
   wherein a file name of the file is determined based on the information which is received after the object is selected, and
   wherein the file is transmitted to a transmission destination that is determined by adding the information which is received after the object is selected to the set transmission destination.

9. A non-transitory computer-readable storage medium storing a program for causing a processor to execute a method of controlling an image processing apparatus having a scanner for scanning a document to generate image data, a communication interface and a user interface for receiving information from a user, that is able to display an object for which a transmission destination is set, the method comprising:
   scanning a document with the scanner after the user interface receives the information from the user after the object is selected; and
   transmitting, by the communication interface, a file based on the image data generated by the scanner based on at least the transmission destination set for the object without receiving the information after the scanner scans the document,
   wherein a file name of the file is determined based on the information which is received after the object is selected, and
   wherein the file is transmitted to a transmission destination that is determined by adding the information which is received after the object is selected to the set transmission destination.

* * * * *